(12) United States Patent
Dong et al.

(10) Patent No.: US 12,227,919 B2
(45) Date of Patent: Feb. 18, 2025

(54) HYDRAULIC CONTROL SYSTEM FOR BOOM FLOATING OF EXCAVATOR AND CONTROL METHOD THEREOF

(71) Applicant: Xuzhou XCMG Excavator Machinery Co., Ltd., Jiangsu (CN)

(72) Inventors: Yuzhong Dong, Jiangsu (CN); Yunbo Xiao, Jiangsu (CN); Yuefeng Jin, Jiangsu (CN); Heng Miao, Jiangsu (CN); Jinhui Huang, Jiangsu (CN); Shangjun Nan, Jiangsu (CN); Xinkui Zhang, Jiangsu (CN); Jishen Lin, Jiangsu (CN); Xiaodong Li, Jiangsu (CN)

(73) Assignee: Xuzhou XCMG Excavator Machinery Co., Ltd., Jiangsu (CN)

( * ) Notice: Subject to any disclaimer, the term of this patent is extended or adjusted under 35 U.S.C. 154(b) by 0 days.

(21) Appl. No.: 18/518,469

(22) Filed: Nov. 23, 2023

(65) Prior Publication Data
US 2024/0200305 A1   Jun. 20, 2024

(30) Foreign Application Priority Data
Dec. 16, 2022   (CN) .......................... 202211623204.1

(51) Int. Cl.
*E02F 9/22* (2006.01)
*F15B 13/04* (2006.01)
*F15B 13/044* (2006.01)

(52) U.S. Cl.
CPC .......... *E02F 9/2203* (2013.01); *E02F 9/2285* (2013.01); *E02F 9/2292* (2013.01);
(Continued)

(58) Field of Classification Search
CPC ..... E02F 9/2203; E02F 9/2285; F15B 21/082; F15B 2211/355; F15B 2211/7741
See application file for complete search history.

(56) References Cited

U.S. PATENT DOCUMENTS

2016/0251830 A1\* 9/2016 Son .................. F15B 11/028
60/445

FOREIGN PATENT DOCUMENTS

| CN | 103437395 | 12/2013 |
|----|-----------|---------|
| CN | 110144985 | 8/2019  |

(Continued)

OTHER PUBLICATIONS

"Office Action of China Counterpart Application", issued on May 23, 2023, pp. 1-6.

*Primary Examiner* — Abiy Teka
(74) *Attorney, Agent, or Firm* — JCIPRNET

(57) ABSTRACT

Disclosed are a hydraulic control system for boom floating of an excavator and a control method thereof. In the hydraulic circuit, a main pump supplies oil to the boom cylinder through a boom reversing valve, and two working ports of the boom reversing valve are connected to a rod cavity and a rodless cavity of the boom cylinder respectively. A rod cavity floating valve and a rodless cavity floating valve are connected to an oil circuit between the rod cavity of the boom cylinder and the boom reversing valve and an oil circuit between the rodless cavity of the boom cylinder and the boom reversing valve respectively. A pilot oil pump and a handle pilot valve are arranged on the pilot oil circuit, an oil inlet of the handle pilot valve is connected to the pilot oil pump.

11 Claims, 4 Drawing Sheets

(52) U.S. Cl.
CPC ........ *F15B 13/0401* (2013.01); *F15B 13/044* (2013.01); *F15B 2211/7741* (2013.01)

(56) References Cited

FOREIGN PATENT DOCUMENTS

| | | | | |
|---|---|---|---|---|
| EP | 389136 A | * | 9/1990 | .............. E02F 3/435 |
| WO | WO-2014123300 A1 | * | 8/2014 | ................ E02F 3/32 |

* cited by examiner

HYDRAULIC CONTROL SYSTEM FOR BOOM FLOATING OF EXCAVATOR AND CONTROL METHOD THEREOF

CROSS-REFERENCE TO RELATED APPLICATION

This application claims the priority benefit of China application serial no. 202211623204.1, filed on Dec. 16, 2022. The entirety of the above-mentioned patent application is hereby incorporated by reference herein and made a part of this specification.

BACKGROUND OF THE INVENTION

Technical Field

The invention relates to the technical field of engineering machines, in particular to a hydraulic control system for boom floating of an excavator and a control method thereof.

2. DESCRIPTION OF RELATED ART

Excavators are engineering machines which are used most widely. The boom, arm and bucket of the excavator are articulated together to form a working device, which is driven by a boom cylinder, an arm cylinder and a bucket cylinder to realize excavation, and the excavator can also turn and travel flexibly to adapt to various complex conditions and satisfy various functional requirements. When the excavator is used for leveling, the motion speed and angle of the boom need to be continuously and accurately adjusted to adapt to the motion of the arm to ensure that the force applied to the ground by the bucket is relatively constant to realize a good leveling effect. In addition, when the excavator is used for breaking, the boom will suffer from an upward reactive force at the moment a breaker hammer breaks rocks or other objects, so operators have to continuously and accurately control the downward force of the boom to guarantee the stability of the whole excavator. These multi-motion complex operations require high skills and extensive experience of operators and easily cause fatigue of the operators. The boom floating function can reduce boom operations and the requirements for the operating skills of operators, and especially when the excavator is used for leveling, can effectively reduce the operating difficulty and intensity.

At present, the boom control valve of mainstream medium and large-tonnage excavators is a three-position reversing valve without the boom floating function. To fulfill the boom floating function, some manufacturers upgrade the three-position reversing valve into a four-position reversing valve by adding a floating position, which requires the development of a new main valve spool and valve body, a pilot valve adaptable to the boom floating function, and a great change to existing hydraulic systems, making development and debugging difficult and leading to a large amount of capital and time investment.

BRIEF SUMMARY OF THE INVENTION

The objective of the invention is to provide a hydraulic control system for boom floating of am excavator and a control method thereof, which can fulfill the boom floating function without changing the main configuration of existing hydraulic systems, thus reducing the operating difficulty and intensity of the excavator. The technical solution adopted by the invention is as follows.

In a first aspect, the invention provides a hydraulic control system for boom floating of an excavator, comprising a boom cylinder, a hydraulic circuit and a controller, wherein the hydraulic circuit comprises a main oil circuit and a pilot oil circuit, a main pump and a boom reversing valve are arranged on the main oil circuit, the main pump supplies oil to the boom cylinder through the boom reversing valve, and two working ports of the boom reversing valve are connected to a rod cavity and a rodless cavity of the boom cylinder respectively;

a rod cavity floating valve is connected to an oil circuit between the rod cavity of the boom cylinder and the boom reversing valve, a rodless cavity floating valve is connected to an oil circuit between the rodless cavity of the boom cylinder and the boom reversing valve, and the rod cavity and the rodless cavity of the boom cylinder are connected to an oil tank through the rod cavity floating valve and the rodless cavity floating valve respectively; the controller is connected to a control terminal of the rod cavity floating valve, a control terminal of the rodless cavity floating valve and a control terminal of a floating pilot solenoid valve;

a pilot oil pump and a handle pilot valve are arranged on the pilot oil circuit, an oil inlet of the handle pilot valve is connected to the pilot oil pump, and two pilot ports of the handle pilot valve are connected to two reversing control ports of the boom reversing valve respectively.

In use, an operating handle controls, through the handle pilot valve, the boom reversing valve to reverse to enable the boom cylinder to stretch or retreat according to an action mode corresponding to the action of the operating handle to drive a boom to ascend or descend. In the ascending or descending process of the boom, the controller controls a floating valve group to be opened or closed to allow a rod cavity or a rodless cavity of the boom cylinder to be connected to the hydraulic oil tank in a boom up-floating mode or a boom down-floating mode to drive the boom to float upward or downward.

Optionally, the rod cavity floating valve and the rodless cavity floating valve are solenoid valves or hydraulic control valves, a passage of the rod cavity floating valve has an end connected to the oil tank and an end connected to the main oil circuit between the rod cavity of the boom cylinder and the boom reversing valve, and a passage of the rodless cavity floating valve has an end connected to the oil tank and an end connected to the main oil circuit between the rodless cavity of the boom cylinder and the boom reversing valve; and the controller controls the rod cavity floating valve and the rodless cavity floating valve to be opened or closed. The rod cavity floating valve and the rodless cavity floating valve are preferably two-position two-way solenoid valves, the controller outputs electrical signals to control the position of valve spools of the rod cavity floating valve and the rodless cavity floating valve. When the valve spools are located at the bottom, the valves are closed; and when the valve spools are located at the top, the valves are opened.

Optionally, one end of the passage of the rod cavity floating valve is connected to the oil tank through an adjustable throttling valve. The backpressure of the rod cavity of the boom cylinder in a floating state can be manually controlled by adjusting the size of an orifice.

Optionally, the floating pilot solenoid valve is connected to the pilot oil circuit between the pilot port, corresponding to boom descending, of the handle pilot valve and the corresponding reversing control port of the boom reversing port, and the controller is configured to control the floating pilot solenoid valve to turned on or off the pilot oil circuit where the floating pilot solenoid valve is located.

Optionally, the floating pilot solenoid valve is a two-position three-way solenoid valve, and has a main oil inlet P3 connected to the pilot port, corresponding to boom descending, of the handle pilot valve, an oil return port T3 connected to the oil tank, and a pilot port A3 connected to a reversing control port X2 of the boom reversing valve; and when the floating pilot solenoid valve is in an open state, A3 is connected to P3 and T3.

Optionally, pressure sensors are connected to the two pilot ports of the handle pilot valve respectively, and signal output terminals of the pressure sensors are connected to the controller.

In the above technical solution, when the pilot oil circuit between the pilot port, corresponding to boom descending, of the handle pilot valve and the reversing control port X2 of the boom reversing valve is turned off, boom descending cannot be directly controlled and operated through the operating handle anymore.

Optionally, the hydraulic control system for boom floating of an excavator according further comprises a mode setting unit, wherein the mode setting unit comprises a floating mode switch and a breaking mode switch;
boom operating modes comprise a routine mode, an up-floating mode, a down-floating mode and a bidirectional floating mode;
in the routine mode, the floating mode switch and the breaking mode switch are both in an off state, the controller controls the pilot oil circuit between the handle pilot valve and the boom reversing valve to be turned on, and the operating handle controls the boom cylinder to act through the handle pilot valve and the boom reversing valve;
in a case where a boom is controlled to ascend, if the floating mode switch is in an on state, the controller controls the rod cavity floating valve to be opened to allow the boom to enter the up-floating mode;
in a case where the boom is controlled to descend, if the floating mode switch and the breaking mode switch are both in an on state, when the operating handle acts to enable the pilot port, corresponding to boom descending, of the handle pilot valve to be connected to the corresponding reversing control port of the boom reversing valve and a pressure of the pilot oil circuit is greater than a preset value, the controller controls the rodless cavity floating valve to be opened and controls the floating pilot solenoid valve to turn off the pilot oil circuit where the floating pilot solenoid valve is located, to allow the boom to enter the down-floating mode;
if the floating mode switch is in an on state, the breaking mode switch is in an off state and the operating handle for controlling the boom to descend acts, when the pressure of the pilot oil circuit to which the pilot oil port, corresponding to boom descending, of the handle pilot valve is connected is greater than the preset value, the controller controls the rod cavity floating valve and the rodless cavity floating valve to be opened and controls the floating pilot solenoid valve turns off the pilot oil circuit where the floating pilot solenoid valve is located, to allow the boom to enter the bidirectional floating mode.

Optionally, the mode setting unit further comprises a floating pause button arranged on the operating handle;
if the floating pause button on the operating handle is pressed, the controller controls the rod cavity floating valve and the rodless cavity floating valve to be closed to pause floating in the up-floating mode, the down-floating mode or the bidirectional floating mode.

In a second aspect, the invention provides a control method of the hydraulic control system for boom floating of an excavator in the first aspect, comprising:
acquiring floating mode enable information, breaking mode enable information, and pressure information of the two pilot ports of the handle pilot valve;
if neither the floating mode nor the breaking mode is enabled, determining that an operating mode of a target boom is the routine mode, controlling the pilot oil circuit between the handle pilot valve and the boom reversing valve to be turned on to close the rod cavity floating valve and the rodless cavity floating valve, and controlling, by the operating handle, the boom cylinder to act through the handle pilot valve and the boom reversing valve;
if the floating mode is enabled and the breaking mode is not enabled, when the operating handle for controlling the boom to ascend acts, determining that the operating mode of the target boom is the up-floating mode, and controlling the rod cavity floating valve to be opened to allow the boom to enter the up-floating mode;
if both the floating mode and the breaking mode are enabled, when the operating handle for controlling the boom to descend acts to allow the pilot oil port, corresponding to boom descending, of the handle pilot valve to be connected to the corresponding reversing control port of the boom reversing valve and the pressure of the pilot circuit is greater than a preset value, determining that the operating mode of the target boom is the down-floating mode, controlling the rodless cavity floating valve to be opened, and controlling the pilot solenoid valve to turn off the pilot circuit where the pilot solenoid valve is located, to allow the boom to enter the down-floating mode; and
if the floating mode is enabled and the breaking mode is not enabled, when the operating handle for controlling the boom to descend acts and the pressure of the pilot oil circuit, to which the pilot port, corresponding to boom descending, of the handle pilot valve is connected, is greater than the preset value, determining that the operating mode of the target boom is the bidirectional floating mode, controlling the rod cavity floating valve and the rodless cavity floating valve to be opened, and controlling the pilot solenoid valve to turn off the pilot circuit where the pilot solenoid valve is located.

Optionally, the control method further comprises: when the floating pause button arranged on the operating handle is pressed, receiving a floating pause signal; and
in response to the received floating pause signal, controlling the rod cavity floating valve and the rodless cavity floating valve to be closed.

In the above technical solution, the floating mode enable information, breaking mode enable information, and the floating pause information are acquired according to signals emitted when the corresponding switches are pressed or released.

Beneficial Effect

Compared with the prior art, the invention has the following advantages and improvements:

(1) The floating valve group is connected between the main oil circuit of the rod cavity and the rodless cavity of the boom cylinder and the oil tank, so the boom floating function of an excavator can be realized without upgrading mature hydraulic elements of existing excavators, to adapt to the breaking condition, the leveling condition or other conditions of the excavator;

In the leveling condition where the angle between the arm and the ground is less than 90°, when the far end of the excavator retreats for leveling, the arm is operated to retreat; when the far end of the excavator swings out for leveling, the arm is operated to swing outwards, the operating handle is directly pushed in position, and the force applied to the ground by the bucket can be kept constant without adjusting the boom, thus realizing a good leveling effect and reducing the operating difficulty and intensity;

In the breaking condition, the force applied to rocks or other objects by a drill rod of the breaker hammer can be kept constant under the action of the floating valve group and the gravity of the working device of the excavator, and the downward force applied by the boom does not to be accurately controlled manually, thus lowering the operating difficulty and intensity;

In the leveling condition, a good leveling effect can be realized merely by directly pushing the operating handle for controlling the boom to descend in position without continuously adjusting the boom to cooperate with the arm, thus reducing the operating difficulty and intensity; grounds different in hardness can leveled by adjusting an adjustable orifice of the floating solenoid valve group;

In a case where the weight of the working device cannot satisfy a desired downward force when the excavator is used for leveling or tamping, the floating function can be paused by means of the button on the handle to allow the boom to return to the routine mode, thus greatly improving the working efficiency and adaptability of the excavator;

(2) In the floating modes, users just need to operate a two-position switch in the driving cab, and the floating-down mode and the bidirectional mode can be enabled according to actual operations of operators and can be switched automatically;

(3) The hydraulic control system provided by the invention can be obtained by adding a few elements and making a small change to an existing hydraulic system of the boom of an excavator, is simple in system structure and clear in control logic, and can fulfill the boom floating function easily;

(4) The floating valve group in the invention is simple in structure, low in technical difficulty and good in universality;

(5) The operating handle must be operated to implement the boom down-floating mode and the bidirectional floating mode, thus guaranteeing the operating safety of the excavator.

BRIEF DESCRIPTION OF THE SEVERAL VIEWS OF THE DRAWINGS

In FIGS. 1-4: 1, oil tank; 2, oil pump; 2-1, main oil pump; 2-2, pilot oil pump; 3, boom reversing valve; 4, floating valve group; 4-1, rod cavity floating valve; 4-2, rodless cavity floating valve; 4-3, adjustable throttling valve; 5, boom cylinder; 6, controller; 7, handle pilot valve; 8, pressure sensor; 9, floating pilot solenoid valve.

DETAILED DESCRIPTION OF THE INVENTION

Figure 1:
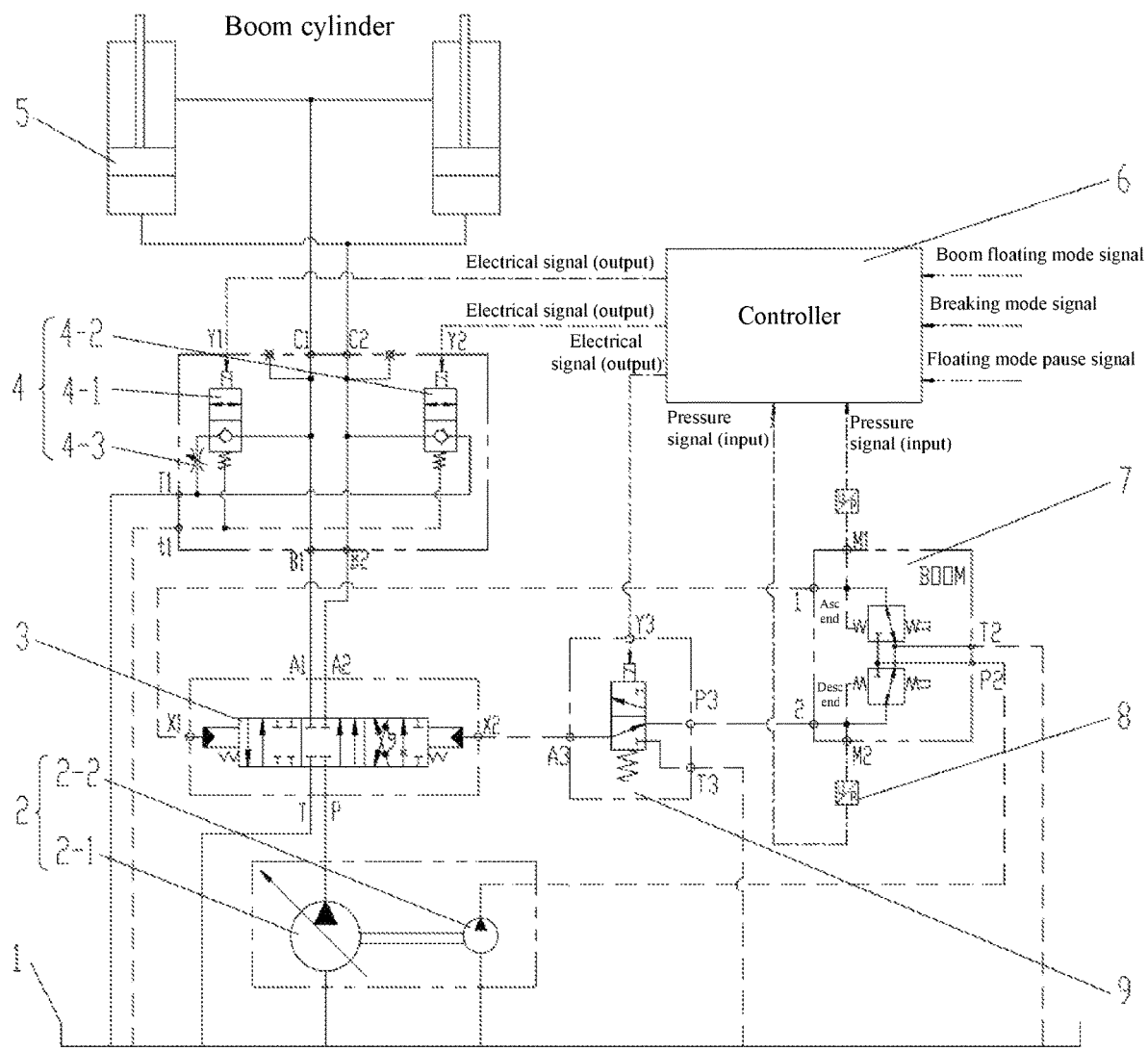
FIG. 1 is a schematic diagram of a hydraulic control system in a routine mode according to an embodiment of the invention.

The invention will be further described below in conjunction with accompanying drawings and specific embodiments.

The main technical conception of the invention is to fulfill the boom floating function by adding a floating valve group and other related elements and improving the control logic without changing the main configuration of existing hydraulic systems. Other related elements, except the floating valve group, may comprise floating pilot solenoid valves, pressure sensors, electrical switches, and the like.

Embodiment 1

This embodiment provides a hydraulic control system for boom floating of an excavator. Referring to FIG. 1 to FIG. 4, the hydraulic control system comprises a boom cylinder 5, a hydraulic circuit and a controller 6, wherein the hydraulic circuit comprises a main oil circuit and a pilot oil circuit, a main pump 2-1 and a boom reversing valve 3 are arranged on the main oil circuit, the main pump 2-1 supplies oil to the boom cylinder 5 through the boom reversing valve 3, and two working ports A1 and A2 of the boom reversing valve 3 are connected to a rod cavity and a rodless cavity of the boom cylinder 5 respectively;

A rod cavity floating valve 4-1 and a rodless cavity floating valve 4-2 are connected to an oil circuit between the rod cavity of the boom cylinder 5 and the boom reversing valve and an oil circuit between the rodless cavity of the boom cylinder 5 and the boom reversing valve respectively, such that the rod cavity and the rodless cavity of the boom cylinder 5 are connected to an oil tank 1 through the rod cavity floating valve 4-1 and the rodless cavity floating valve 4-2 respectively; the controller 6 is connected to a control terminal of the rod cavity floating valve 4-1 and a control terminal of the rodless cavity floating valve 4-2;

A pilot oil pump 2-2 and a handle pilot valve 7 are arranged on the pilot oil circuit, an oil inlet of the handle pilot valve 7 is connected to the pilot oil pump 2-2, two pilot ports 1 (M1) and 2 (M2) of the handle pilot valve 7 are connected to two reversing control ports X1 and X2 of the boom reversing valve 3 respectively.

The rod cavity floating valve 4-1 and the rodless cavity floating valve 4-2 form a floating valve group 4. In use, an operating handle controls, through the handle pilot valve 7, the boom reversing valve 3 to reverse to enable the boom cylinder 5 to stretch or retreat according to an action mode corresponding to the action of the operating handle to drive a boom to ascend or descend. In the ascending or descending process of the boom, the controller 6 controls the floating valve group 4 to be opened or closed to allow the rod cavity or the rodless cavity of the boom cylinder 5 to be connected to the hydraulic oil tank 1 in a boom up-floating mode or a boom down-floating mode to drive the boom to float upward or downward.

In this embodiment, the rod cavity floating valve 4-1 and the rodless cavity floating valve 4-2 are two-position two-way solenoid valves respectively, one end of a passage of the rod cavity floating valve 4-1 is connected to the oil tank 1, the other end of the passage of the rod cavity floating valve 4-1 is connected to the main oil circuit between the rod cavity of the boom cylinder and the working port A1 of the boom reversing valve; one end of a passage of the rodless cavity floating valve 4-2 is connected to the oil tank 1, the other end of the passage of the rodless cavity floating valve 4-2 is connected to the main oil circuit between the rodless cavity of the boom cylinder and the working port A2 of the boom reversing valve; the controller 6 sends control signals to a port Y1 of the rod cavity floating valve 4-1 and a port Y2 of the rodless cavity floating valve 4-2 to control the rod cavity floating valve 4-1 and the rodless cavity floating valve 4-2 to be opened or closed respectively. When valve spools of the valves are located at the bottom, the valves are closed; and when the valve spools of the valves are located at the top, the valves are opened. In addition, in a case where a hydraulically-controlled floating valve group is used as the floating valve group 4, the same function can be fulfilled by adding a pilot solenoid valve.

One end of the passage of the rod cavity floating valve 4-1 is connected to the oil tank 1 through an adjustable throttling valve 4-3, and the backpressure of the rod cavity of the boom cylinder in a floating state can be manually controlled by adjusting the size of an orifice.

To improve the safety in the boom down-floating mode, the pressure of the pilot port 2 (M2), corresponding to boom descending, of the handle pilot valve 7 should be greater than a preset value, which is an essential condition for realizing down-floating and bidirectional floating of a boom. In this embodiment, a floating pilot solenoid valve 9 is connected to the pilot oil circuit between the pilot port 2 (M2), corresponding to boom descending, of the handle pilot valve 7 and the reversing control port X2 of the boom reversing valve 3; the floating pilot solenoid valve 9 is a two-position three-way solenoid valve, and has a main oil inlet P3 connected to the pilot port 2 (M2), corresponding to boom descending, of the handle pilot valve 7, an oil return port T3 connected to the oil tank 1, and a pilot port A3 connected to the reversing control port X2 of the boom reversing valve 3; and when the floating pilot solenoid valve 9 is in an open state, A3 is connected to P3 and T3. When A3 is connected to T3, the pilot oil circuit between the pilot port 2 (M2), corresponding to boom descending, of the handle pilot valve 7 and the reversing control port X2 of the boom reversing valve 3 is turned off, so boom descending cannot be directly controlled and operated through the operating handle anymore. The controller 6 sends a control signal to a port Y3 of the floating pilot solenoid valve 9 to control the floating pilot solenoid valve 9 to turned on or off the pilot oil circuit where the floating pilot solenoid valve 9 is located.

Pressure sensors 8 are connected to the two pilot ports 1 (M1) and 2 (M2) of the handle pilot valve 7 respectively, and signal output terminals of the pressure sensors 8 are connected to the controller. In this way, under the condition where a floating mode is enabled, the controller 6 determines whether a pressure signal of the pilot port 2 (M2) of the handle pilot valve 7 is greater than the preset value and whether the breaking mode is enabled to determine an actual floating mode to properly control the rod cavity floating valve 4-1, the rodless cavity floating valve 4-2 and the floating pilot solenoid valve 9 to be opened to drive the boom to float downward or bidirectionally.

Figure 2:
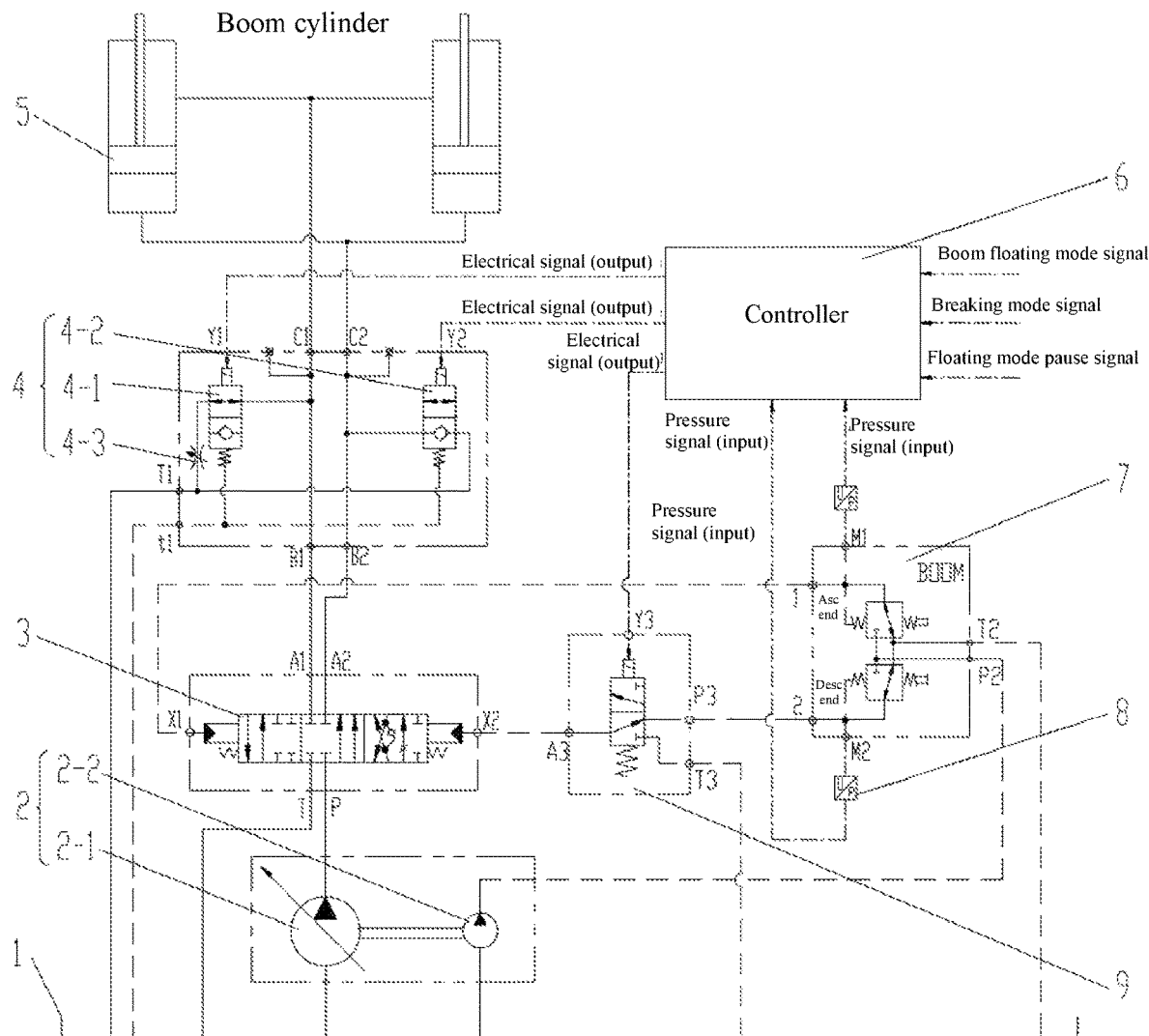
FIG. 2 is a schematic diagram of the hydraulic control system in a boom up-floating mode according to the embodiment in FIG. 1.
Figure 3:
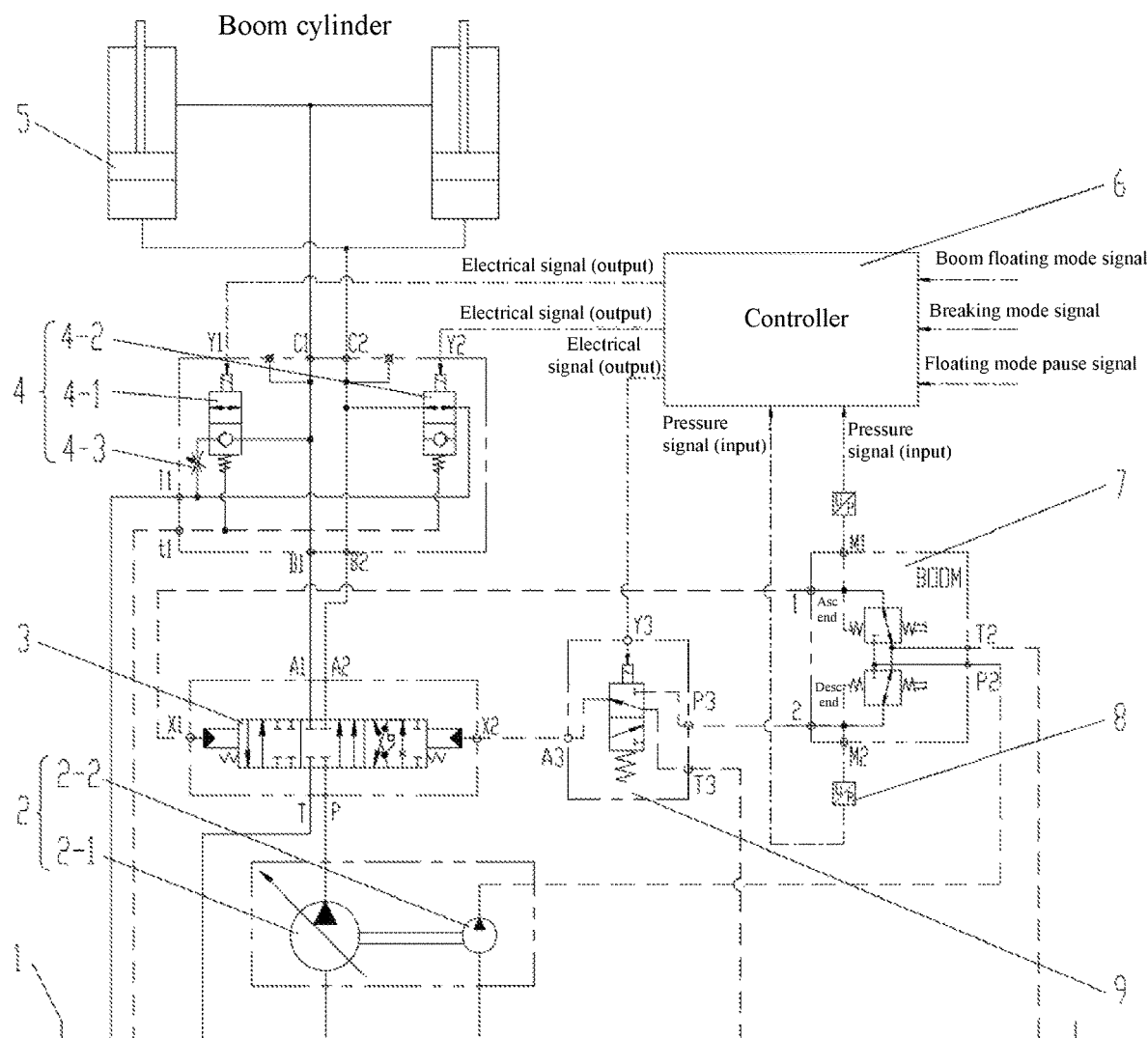
FIG. 3 is a schematic diagram of the hydraulic control system in a boom down-floating mode according to the embodiment in FIG. 1.
Figure 4:
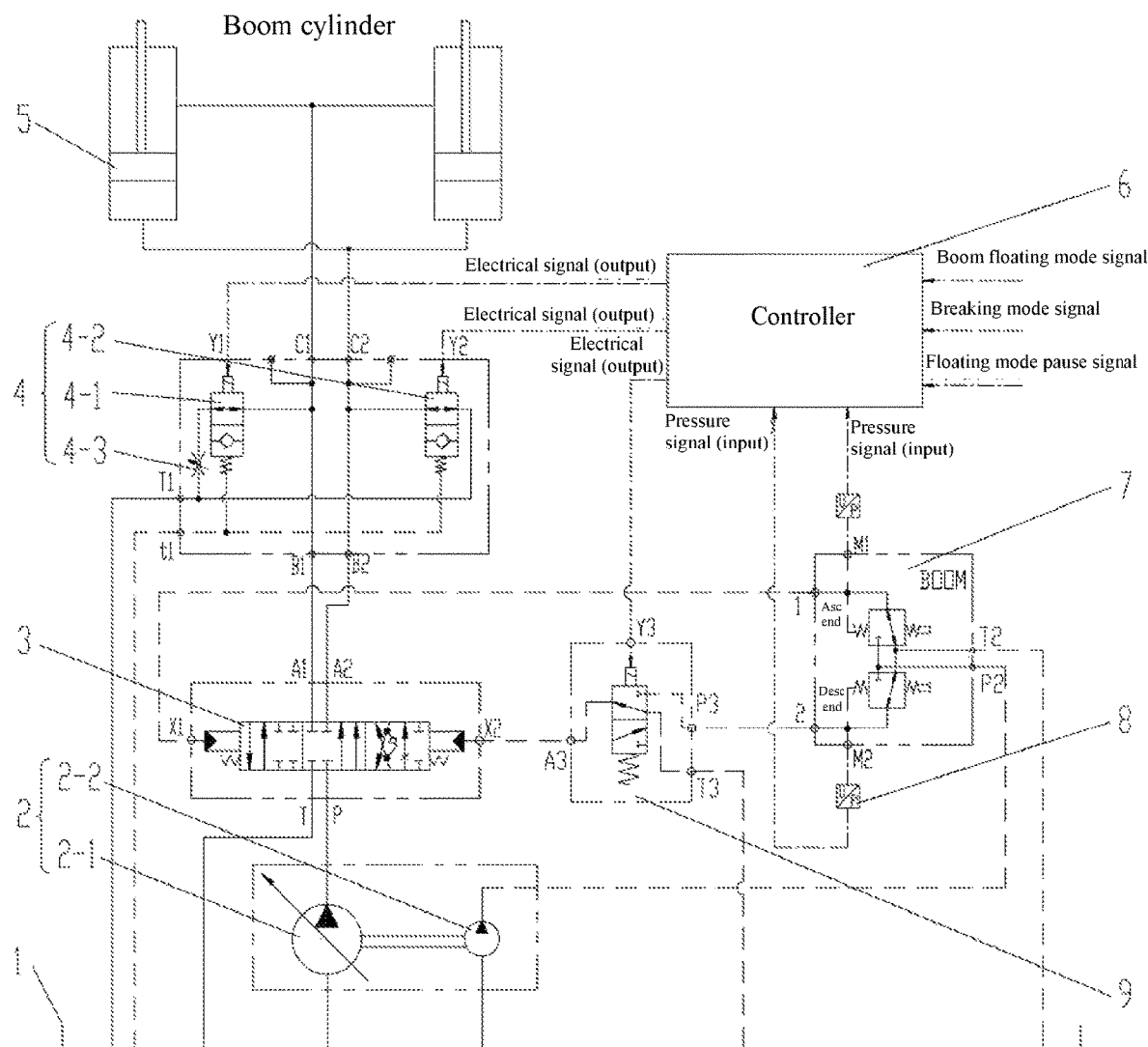
FIG. 4 is a schematic diagram of the hydraulic control system in a boom bidirectional floating mode according to the embodiment in FIG. 1.

In this embodiment, the hydraulic control system for boom floating of an excavator further comprises a mode setting unit, wherein the mode setting unit comprises a floating mode switch, a breaking mode switch, and a floating pause button arranged on the operating handle;

Boom operating modes comprise a routine mode, an up-floating mode, a down-floating mode and a bidirectional floating mode;

Referring to FIG. 1, in the routine mode, the floating mode switch and the breaking mode switch are both in an off state, the controller 6 does not receive a floating mode enable signal and will not output a floating mode-related electrical signal, valve spools of the rod cavity floating valve 4-1, the rodless cavity floating valve 4-2 and the floating pilot solenoid valve 9 are all located at the bottom, the pilot oil circuit between the handle pilot valve 7 and the boom reversing valve 3 is turned on, and the operating handle controls the boom cylinder 5 to act through the handle pilot valve 7 and the boom reversing valve 3;

Referring to FIG. 2, in a case where a boom is controlled to ascend, if the floating mode switch is in an on state, the controller 6 controls the rod cavity floating valve 4-1 to be opened, and the boom enters an up-floating state;

Referring to FIG. 3, in a case where the boom is controlled to descend, if the floating mode switch and the breaking mode switch are both in an on state, the operating handle acts to enable the pilot port 2 (M2) corresponding to boom descending and an oil inlet P2 of the handle pilot valve 7 to be connected to the reversing control port X2 of the boom reversing valve 3, and the controller 6 acquires the pressure of the pilot oil circuit through the pressure sensor 8 at the port M2; when the pressure of the pilot oil circuit is greater than a preset value, the controller 6 outputs electrical signals to Y2 and Y3 to control the rodless cavity floating valve 4-2 and the floating pilot solenoid valve 9 to reverse synchronously, at this moment, the rodless cavity floating valve 4-2 is opened to allow the rodless cavity of the boom cylinder 5 to be connected to the hydraulic oil tank, the floating pilot solenoid valve 9 turns off the pilot oil circuit where the floating pilot solenoid valve 9 is located, and the boom enters a down-floating state;

Referring to FIG. 4, if the floating mode switch is in an on state, the breaking mode switch is in an off state and the operating handle for controlling the boom to descend acts, the pressure of the pilot oil circuit, to which the pilot oil port 2 (M2), corresponding to boom descending, of the handle pilot valve 7 is connected, received by the controller 6 is greater than the preset value, the controller 6 outputs electrical signals to Y1, Y2 and Y3 to control the rod cavity floating valve 4-1, the rodless cavity floating valve 4-2 and the floating pilot solenoid valve 9 to reverse synchronously, the rod cavity floating valve 4-1 and the rodless cavity floating valve 4-2 are opened and connected to the hydraulic oil tank 1, the floating pilot solenoid valve 9 turns off the pilot oil circuit where the floating pilot solenoid valve 9 is located, and the boom enters a bidirectional floating state;

If the floating pause button on the operating handle is pressed, the controller 6 will receive a corresponding floating pause signal, at this moment, the rod cavity floating valve 4-1 and the rodless cavity floating valve 4-2 will be closed temporarily to allow the boom of the excavator to return to a routine state, and floating in the up-floating mode, the down-floating mode or the bidirectional floating mode is paused; when the floating pause button on the operating handle is released, the controller 6 returns to the control state before the floating is paused to enable the boom to return to the previous working mode.

The up-floating mode is especially suitable for a condition where a far end of the excavator is used for leveling, that is, a condition where the angle between the arm and the ground is less than 90°. When the far end of the excavator retreats for leveling, the arm is operated to retreat; when the far end of the excavator swings out for leveling, the arm is operated to swing outwards, the operating handle is directly pushed in position, and the force applied to the ground by the bucket can be kept constant without adjusting the boom, thus realizing a good leveling effect and reducing the operating difficulty and intensity.

The down-floating mode is suitable for a breaking condition. In the breaking condition, the force applied to rocks or other objects by a drill rod of the breaker hammer can be kept constant by means of floating of the boom and the gravity of the working device of the excavator, and the downward force applied by the boom does not to be accurately controlled manually, thus lowering the operating difficulty and intensity;

The bidirectional floating mode is suitable for a leveling condition. In the leveling condition, a good leveling effect can be realized merely by directly pushing the operating handle for controlling the boom to descend in position without continuously adjusting the boom to cooperate with the arm, thus reducing the operating difficulty and intensity; grounds different in hardness can leveled by adjusting an adjustable orifice of the floating solenoid valve group;

In a case where the weight of the working device cannot satisfy a desired downward force when the excavator is used for leveling or tamping, the floating function can be paused by means of the button on the handle to allow the boom to return to the routine mode, thus greatly improving the working efficiency and adaptability of the excavator.

Embodiment 2

This embodiment provides a control method of the hydraulic control system for boom floating of an excavator. The control method may be implemented by the controller in Embodiment 1 and comprises:

Acquiring, by the controller 6, floating mode enable information, breaking mode enable information, and pressure information of the pilot ports of the handle pilot valve 7;

If neither the floating mode nor the breaking mode is enabled, determining, by the controller 6, that the operating mode of a target boom is the routine mode, controlling the operating handle to act to turn on the pilot oil circuit between the handle pilot valve 7 and the boom reversing valve 3 to close the rod cavity floating valve 4-1 and the rodless cavity floating valve 4-2, and controlling, by the operating handle, the boom cylinder 5 to act through the handle pilot valve 7 and the boom reversing valve 3;

In a case where the boom is controlled to ascend, if the floating mode is enabled and the breaking mode is not enabled, determining, by the controller 6, that the operating mode of the target boom is the up-floating mode, and controlling the rod cavity floating valve 4-1 to be opened to allow the boom to enter the up-floating mode;

If both the floating mode and the breaking mode are enabled, when the operating handle for controlling the boom to descend acts to allow the pilot oil port, corresponding to boom descending, of the handle pilot valve 7 to be connected to the corresponding reversing control port of the boom reversing valve 3 and the pressure of the pilot circuit is greater than a preset value, determining, by the controller 6, that the operating mode of the target boom is the down-floating mode, controlling the rodless cavity floating valve 4-2 to be opened, and controlling the pilot solenoid valve 9 to turn off the pilot circuit where the pilot solenoid valve 9 is located, to allow the boom to enter the down-floating mode;

If the floating mode is enabled and the breaking mode is not enabled, when the operating handle for controlling the boom to descend acts and the pressure of the pilot oil circuit, to which the pilot port, corresponding to boom descending, of the handle pilot valve 7 is connected, is greater than the preset value, determining, by the controller, that the operating mode of the target boom is the bidirectional floating mode, controlling the rod cavity floating valve 4-1 and the rodless cavity floating valve 4-2 to be opened, and controlling the pilot solenoid valve 9 to turn off the pilot circuit where the pilot solenoid valve 9 is located; and When the floating pause button arranged on the operating handle is pressed, receiving, by the controller 6, a floating pause signal, and in response to the received floating pause signal, controlling, by the controller, the rod cavity floating valve 4-1 and the rodless cavity floating valve 4-2 to be closed.

As can be known from the above embodiment, the boom floating function of an excavator can be fulfilled without upgrading mature hydraulic elements of excavators and greatly changing the hydraulic system of the boom of an original excavator. A few elements are added, the system is simple, the control logic is clear, the universality is good, the boom floating function is easy to fulfill, the safety in the operating process is improved, and the technical difficulty is greatly reduced.

The embodiments of the invention are described above in conjunction with accompanying drawings, but the invention is not limited to the specific embodiments described above. The above specific embodiments are illustrative rather than restrictive. Those ordinarily skilled in the art can obtain many other forms without departing from the concept of the invention and the protection scope of the claims, and all these forms should also fall within the protection scope of the invention.

What is claimed is:

1. A hydraulic control system for boom floating of an excavator, comprising a boom cylinder, a hydraulic circuit and a controller, wherein the hydraulic circuit comprises a main oil circuit and a pilot oil circuit, a main pump and a boom reversing valve are arranged on the main oil circuit, the main pump supplies oil to the boom cylinder through the boom reversing valve, and two working ports of the boom reversing valve are connected to a rod cavity and a rodless cavity of the boom cylinder respectively;

a rod cavity floating valve is connected to an oil circuit between the rod cavity of the boom cylinder and the boom reversing valve, a rodless cavity floating valve is connected to an oil circuit between the rodless cavity of the boom cylinder and the boom reversing valve, and the rod cavity and the rodless cavity of the boom cylinder are connected to an oil tank through the rod cavity floating valve and the rodless cavity floating valve respectively; the controller is connected to a control terminal of the rod cavity floating valve, a control terminal of the rodless cavity floating valve and a control terminal of a floating pilot solenoid valve;

a pilot oil pump and a handle pilot valve are arranged on the pilot oil circuit, an oil inlet of the handle pilot valve is connected to the pilot oil pump, and two pilot ports of the handle pilot valve are connected to two reversing control ports of the boom reversing valve respectively, wherein said end of the passage of the rod cavity floating valve is connected to the oil tank through an adjustable throttling valve.

2. The hydraulic control system for boom floating of the excavator according to claim 1, wherein the rod cavity floating valve and the rodless cavity floating valve are solenoid valves or hydraulic control valves, a passage of the rod cavity floating valve has an end connected to the oil tank and an end connected to the main oil circuit between the rod cavity of the boom cylinder and the boom reversing valve, and a passage of the rodless cavity floating valve has an end connected to the oil tank and an end connected to the main oil circuit between the rodless cavity of the boom cylinder and the boom reversing valve; and the controller controls the rod cavity floating valve and the rodless cavity floating valve to be opened or closed.

3. The hydraulic control system for boom floating of the excavator according to claim 2, wherein said end of the passage of the rod cavity floating valve is connected to the oil tank through an adjustable throttling valve.

4. The hydraulic control system for boom floating of the excavator according to claim 1, wherein the floating pilot solenoid valve is connected to the pilot oil circuit between the pilot port, corresponding to boom descending, of the handle pilot valve and the corresponding reversing control port of the boom reversing port, and the controller is configured to control the floating pilot solenoid valve to turned on or off the pilot oil circuit where the floating pilot solenoid valve is located.

5. The hydraulic control system for boom floating of the excavator according to claim 4, wherein the floating pilot solenoid valve is a two-position three-way solenoid valve, and has a main oil inlet P3 connected to the pilot port, corresponding to boom descending, of the handle pilot valve, an oil return port T3 connected to the oil tank, and a pilot port A3 connected to a reversing control port X2 of the boom reversing valve; and when the floating pilot solenoid valve is in an open state, A3 is connected to P3 or T3.

6. The hydraulic control system for boom floating of the excavator according to claim 5, wherein pressure sensors are connected to the two pilot ports of the handle pilot valve respectively, and signal output terminals of the pressure sensors are connected to the controller.

7. The hydraulic control system for boom floating of the excavator according to claim 4, wherein pressure sensors are connected to the two pilot ports of the handle pilot valve respectively, and signal output terminals of the pressure sensors are connected to the controller.

8. The hydraulic control system for boom floating of the excavator according to claim 7, further comprising a mode setting unit, wherein the mode setting unit comprises a floating mode switch and a breaking mode switch;
boom operating modes comprise a routine mode, an up-floating mode, a down-floating mode and a bidirectional floating mode;
in the routine mode, the floating mode switch and the breaking mode switch are both in an off state, the controller controls the pilot oil circuit between the handle pilot valve and the boom reversing valve to be turned on, and an operating handle controls the boom cylinder to act through the handle pilot valve and the boom reversing valve;
in a case where a boom is controlled to ascend, if the floating mode switch is in an on state, the controller controls the rod cavity floating valve to be opened to allow the boom to enter the up-floating mode;
in a case where the boom is controlled to descend, if the floating mode switch and the breaking mode switch are both in an on state, when the operating handle acts to enable the pilot port, corresponding to boom descending, of the handle pilot valve to be connected to the corresponding reversing control port of the boom reversing valve and a pressure of the pilot oil circuit is greater than a preset value, the controller controls the rodless cavity floating valve to be opened and controls the floating pilot solenoid valve to turn off the pilot oil circuit where the floating pilot solenoid valve is located, to allow the boom to enter the down-floating mode;
if the floating mode switch is in an on state, the breaking mode switch is in an off state and the operating handle for controlling the boom to descend acts, when the pressure of the pilot oil circuit to which the pilot oil port, corresponding to boom descending, of the handle pilot valve is connected is greater than the preset value, the controller controls the rod cavity floating valve and the rodless cavity floating valve to be opened and controls the floating pilot solenoid valve turns off the pilot oil circuit where the floating pilot solenoid valve is located, to allow the boom to enter the bidirectional floating mode.

9. The hydraulic control system for boom floating of the excavator according to claim 8, wherein the mode setting unit further comprises a floating pause button arranged on the operating handle;
if the floating pause button on the operating handle is pressed, the controller controls the rod cavity floating valve and the rodless cavity floating valve to be closed to pause floating in the up-floating mode, the down-floating mode or the bidirectional floating mode.

10. A control method of the hydraulic control system for boom floating of an excavator according to claim 1, comprising:
acquiring floating mode enable information, breaking mode enable information, and pressure information of the two pilot ports of the handle pilot valve;
if neither the floating mode nor the breaking mode is enabled, determining that an operating mode of a target boom is the routine mode, controlling the pilot oil circuit between the handle pilot valve and the boom reversing valve to be turned on to close the rod cavity floating valve and the rodless cavity floating valve, and controlling, by the operating handle, the boom cylinder to act through the handle pilot valve and the boom reversing valve;
if the floating mode is enabled and the breaking mode is not enabled, when the operating handle for controlling the boom to ascend acts, determining that the operating mode of the target boom is the up-floating mode, and controlling the rod cavity floating valve to be opened to allow the boom to enter the up-floating mode;
if both the floating mode and the breaking mode are enabled, when the operating handle for controlling the boom to descend acts to allow the pilot oil port, corresponding to boom descending, of the handle pilot valve to be connected to the corresponding reversing control port of the boom reversing valve and the pressure of the pilot circuit is greater than a preset value, determining that the operating mode of the target boom is the down-floating mode, controlling the rodless cavity floating valve to be opened, and controlling the pilot solenoid valve to turn off the pilot circuit where the pilot solenoid valve is located, to allow the boom to enter the down-floating mode; and if the floating mode is enabled and the breaking mode is not enabled, when the operating handle for controlling the boom to descend acts and the pressure of the pilot oil circuit, to which the pilot port, corresponding to boom descending, of the handle pilot valve is connected, is greater than the preset value, determining that the operating mode of the target boom is the bidirectional floating mode, controlling the rod cavity floating valve and the rodless cavity floating valve to be opened, and controlling the pilot solenoid valve to turn off the pilot circuit where the pilot solenoid valve is located.

11. The control method according to claim 10, further comprising: when the floating pause button arranged on the operating handle is pressed, receiving a floating pause signal; and in response to the received floating pause signal, controlling the rod cavity floating valve and the rodless cavity floating valve to be closed.

* * * * *